(12) United States Patent
Neff et al.

(10) Patent No.: US 6,223,126 B1
(45) Date of Patent: Apr. 24, 2001

(54) MULTI-ATTRIBUTE SEISMIC WAVEFORM CLASSIFICATION

(75) Inventors: Dennis B. Neff; Scott A. Runnestrand; Edgar L. Butler, all of Bartlesville, OK (US)

(73) Assignee: Phillips Petroleum Company, Bartlesville, OK (US)

( * ) Notice: Subject to any disclaimer, the term of this patent is extended or adjusted under 35 U.S.C. 154(b) by 0 days.

(21) Appl. No.: 09/420,725

(22) Filed: Oct. 20, 1999

(51) Int. Cl.$^7$ ........................................... G01V 1/28
(52) U.S. Cl. ................................................ 702/16
(58) Field of Search .................. 702/16, 17, 18, 702/14; 367/72, 73

(56) References Cited

U.S. PATENT DOCUMENTS

| | | |
|---|---|---|
| 4,203,161 | 5/1980 | Johnson et al. ............... 367/40 |
| 4,218,766 | 8/1980 | Parrack et al. ............... 367/47 |
| 4,926,394 | 5/1990 | Doyen ............................ 367/358 |
| 5,671,136 | 9/1997 | Willhoit, Jr. ................... 364/421 |

*Primary Examiner*—Donald E. McElheny, Jr.
(74) *Attorney, Agent, or Firm*—George E. Bogatie (57) ABSTRACT

A computer implemented method for analyzing seismic data to discover a real trends of multi-attributes in a seismic data volume is disclosed. According to the disclosed method and apparatus the full waveforms of multiple traces are compared in a zone that extends above and below an interpreted horizon, and the comparisons are made using a correlation algorithm that considers both shape and absolute amplitude of the waveforms being compared. Based on the multiple comparisons, traces are classified according to waveform shape such that maps of common waveform classes show areas of similar lithology and/or hydrocarbon effects.

14 Claims, 7 Drawing Sheets

(2 of 7 Drawing Sheet(s) Filed in Color)

MULTI-ATTRIBUTE SEISMIC WAVEFORM CLASSIFICATION

This invention relates to seismic prospecting for oil and gas reservoirs, and more specifically it relates to processing seismic data in a high speed digital computer using a processing technique which includes classifying full waveform shapes throughout a data volume, and mapping a real trends of multi-attributes revealed by the waveform classification, which trends can be representative of similar lithology and/or hydrocarbon effects.

BACKGROUND OF THE INVENTION

For many years seismic exploration for oil and gas has involved the use of a source of seismic energy and its reception by an array of seismic detectors, generally referred to as geophones. When used on land, the source of seismic energy can be a high explosive charge electrically detonated in a borehole located at a selected point on a terrain, or another energy source having capacity for delivering a series of impacts or mechanical vibrations to the earths surface. Offshore, air gun sources and hydrophone receivers are commonly used. The acoustic waves generated in the earth by these sources are transmitted back from strata boundaries and/or other discontinuities and reach the earth's surface at varying intervals of time, depending on the distance traversed and the characteristics of the subsurface traversed. On land these returning waves are detected by the geophones, which function to transduce such acoustic waves into representative electrical analog signals, which are generally referred to as traces. In use on land, an array of geophones is laid out along a grid covering an area of interest to form a group of spaced apart observation stations within a desired locality to enable construction of three dimensional (3D) views of reflector positions over wide areas. The source, which is offset a desired distance from the geophones, injects acoustic signals into the earth, and the detected signals at each geophone in the array are recorded for later processing using digital computers, where the analog data is generally quantized as digital sample points, e.g., one sample every two milliseconds, such that each sample point may be operated on individually. Accordingly, continuously recorded seismic field traces are reduced to vertical cross sections, or volume representations, or horizontal map views which approximate subsurface structure. The geophone array is then moved along to a new position and the process is repeated to provide a seismic survey. A 3D seismic survey is data gathered at the surface and presented as a volume representation of a portion of the subsurface.

After exploration of an area is completed, data relating to energy detected at a plurality of geophones will have been recorded, where the geophones are located at varying distances from the shotpoint. The data is then reorganized to collect traces from data transmitted at various shotpoints and recorded at various geophone locations, where the traces are grouped such that the reflections can be assumed to have been reflected from a particular point within the earth, i.e., a common midpoint. The individual records or "traces" are then corrected for the differing distance the seismic energy travels through the earth from the corresponding shotpoints, to the common midpoint, and upwardly to the various geophones. This step includes correction for the varying velocities through rock layers of different types and changes in the source and receiver depths. The correction for the varying spacing of shotpoint/geophone pairs is referred to as "normal move out." After this is done the group of signals from the various midpoints are summed. Because the seismic signals are of a sinusoidal nature, the summation process serves to reduce noise in the seismic record, and thus increasing its signal-to-noise ratio. This process is referred to as the "stacking" of common midpoint data, and is well known to those skilled in the art. Accordingly, seismic field data undergoes the above-mentioned corrections, and may also undergo migration, which is an operation on uninterpreted data and involves rearranging of seismic information so that dipping horizons are plotted in their true location. Other more exotic known processing techniques may also be applied, which for example enhance display of faults, stratigraphic features, amplitude versus offset (AVO) or some attribute such as peak amplitude, instantaneous frequency or phase, polarity etc., before the continuously recorded traces are reduced to vertical or horizontal cross sections or horizontal map views.

In the course of seismic exploration, control points may be established by boreholes that penetrate a strata of interest. Quite often, however, the boreholes are widely separated, and only at such sparse control points can the seismic observations be calibrated by comparison of the selected seismic attributes with the texture and composition of the target strata. The seismic survey, having relatively closely spaced observation points that are distributed between the sparse control points, has the potential for providing data to estimate reservoir conditions as they extend away from the wellbore.

Reconnaissance seismic analysis often uses trends of common seismic waveforms to identify prospective geological features. Many of the current processes use simple attributes such as peak amplitude, mean frequency, etc. to show a real trends, with peak amplitude most commonly used since it can represent a "bright-spot" which may be a direct indication of hydrocarbon. More recent methods have used an actual waveform to show a real trends away from the wellbore. There remains, however, a need to include waveform shape analysis using widespread trace-to-trace similarities which compare multi-attributes of the seismic waveforms, for estimating a variation in rock type or texture, i.e. a change in lithology along a given stratum and/or hydrocarbon effects such as oil or gas in the pore space.

Accordingly, it is an object of this invention to allow an interpreter to survey variation of multi-attributes along an interpreted horizon.

Another more specific object of this invention is to analyze waveform shapes of traces in multiple seismic stacks (e.g. stacks of near and far offset) and to classify waveforms, and map any seismic waveform trends that are discovered.

Yet another object of this invention is to allow selection by an interpreter of the number of waveform classes that are assigned for classifying traces in a seismic data volume.

Another more specific object is to utilize a robust method for comparison of trace-to-trace similarities that considers both absolute amplitude and shape of the waveform being compared.

Yet another object of this invention is to extract additional lithological information, which is available from the seismic data volume.

SUMMARY OF THE INVENTION

According to the present invention the foregoing and other objects and advantages are attained in a method and apparatus for using a subset of seismic traces selected from a trace volume for identifying trends of multiple seismic attributes along a subsurface horizon. The method involves comparing the full waveform of each trace in the subset to every other trace in the subset over a predefined zone (or time interval) extending both above and below the subsurface horizon of interest in order to determine a similarity factor for each trace in the subset. The traces in the subset are separated into a number of waveform classes based on the range of variance of the similarity factors for the individual traces in the subset. Finally, the traces are grouped according to the waveform classes so as to show a real trends of multiple seismic attributes in the subsurface.

In a preferred embodiment the method first selects a gathered, stacked and migrated seismic trace volume, in which the interpreted horizon is identified, and further the method selects one or more alternately processed volumes (e.g. near stack, far stack, AVO intercept or gradient, coherency, p-wave section, s-wave section etc.) having the identified same horizon. A corresponding subset of representative traces is then selected from each volume to be processed according to this invention. A robust algorithm, which considers both shape and absolute amplitude of two waveforms being compared, is applied for comparing pairs of traces in the subset where each trace in the subset is compared to every other trace in the subset. Traces in corresponding subsets of all of the volumes to be processed are likewise compared. A similarity factor is determined for each trace in the subset based on its comparison to every other trace in the subset, and a composite subset is then formed by averaging corresponding similarity factors from the subset of each volume. Optionally, weighting for the factors to be averaged can be used.

Next the number of waveform classes, and the number of waveforms to be assigned to a class is selected by the interpreter based on the previously determined range of variance of the similarity factors for the composite subset. A matrix is formed of the composite subset similarity factors with the most common class and succeeding classes of similarity factors being determined in an averaging process, which iteratively eliminates similarity factors from the matrix, starting with elimination of the factors for the most common class of waveforms.

A similarity factor is then determined for each trace in each full volume being processed with these most common waveforms, and composite similarity factors for the volumes are determined by averaging corresponding factors, again with optional weighting. Finally, each trace in each volume is assigned a waveform class based on the highest composite similarity factor, unless the highest factor is below a desired threshold. In this event the trace is assigned a null class. For observation, a map or seismic cube overlay of the waveform classes is output for the full volume.

In another aspect of this invention apparatus comprises a computer programmed to carry out the method for identifying trends of multiple seismic attributes along a subsurface horizon. For large scale 3D exploration data, the computer is preferably a massively parallel machine.

The method and apparatus of this invention compares the full waveform of traces for a time (or depth) interval which extend above and below an interpreted horizon, and further makes comparisons that include all of the traces in the 3D volume where the horizon is interpreted. Each of the traces is then classified such that similar traces can be grouped together for display, e.g. in the order of the quality of match to the first trace selected for the class. Thus the displayed traces emphasize trends of seismic attributes which may be representative of trends of similar lithology and/or hydrocarbon effects. Still other objects and advantages of the present invention will become readily apparent to those skilled in the art from the following detailed description and the drawings, where there is shown and described only one preferred embodiment of the invention.

BRIEF DESCRIPTION OF THE DRAWINGS

The file of this patent contains at least one drawing executed in color. Copies of this patent with color drawing(s) will be provided by the Patent and Trademark Office upon request and payment of the necessary fee.

DETAILED DESCRIPTION OF A PREFERRED EMBODIMENT

Figure 1:
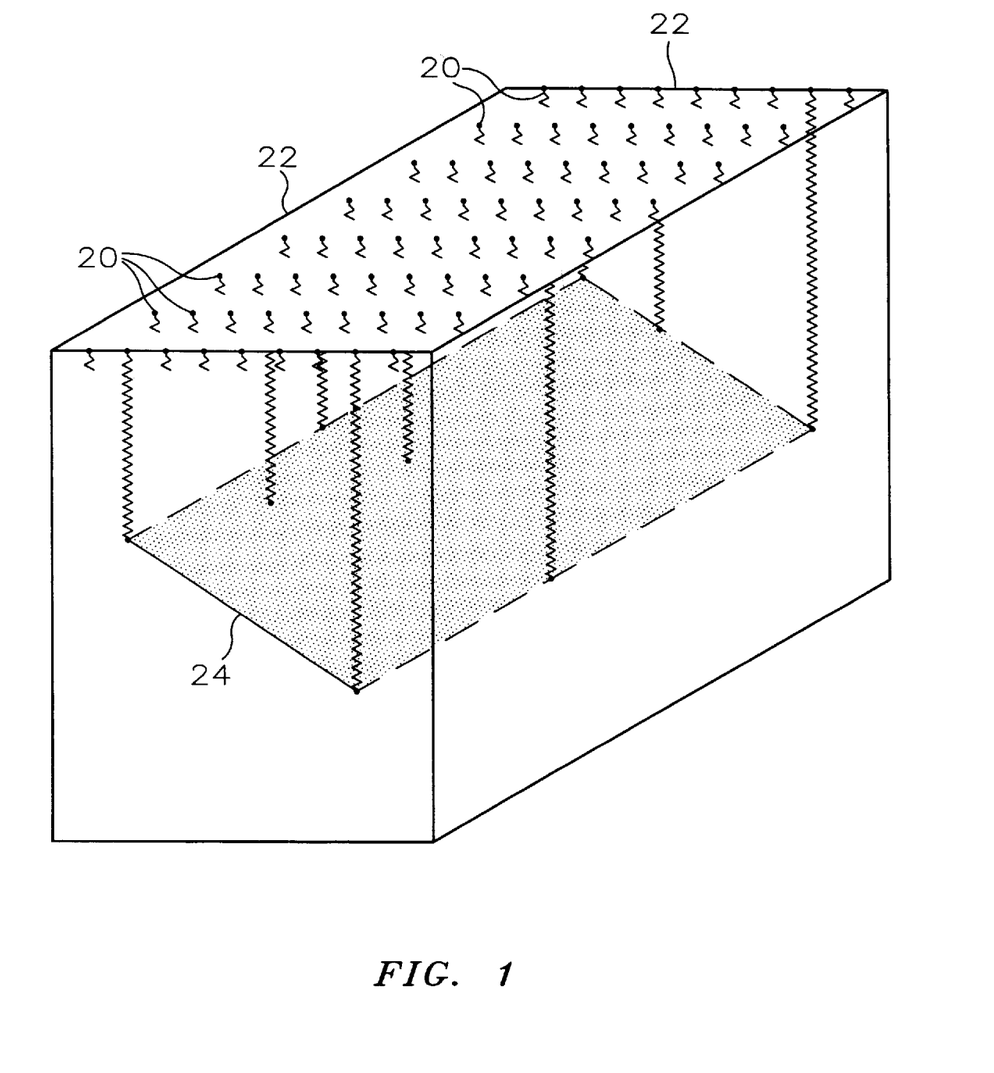
FIG. 1 is a perspective view of a seismic trace volume showing an interpreted horizon picked from traces extending from a surface grid and which intersect the horizon.

FIG. 1 represents a seismic trace volume showing traces 20 arranged in a surface grid array over the area to be surveyed. Typically the area to be surveyed will include an area covered by a thousand or more traces. The traces 20, which have been vertically stacked, extend downwardly from the surface of the earth 22 to intersect a subsurface horizon 24. The horizon partially reflects seismic waves back to the surface, where they are detected. As illustrated the traces are arranged in a rectangular grid which partially covers an area to be surveyed. However, as previously mentioned, the grid array is moved along to a new position and the process repeated to obtain a full survey. The subsurface horizon 24 as illustrated in FIG. 1 will have been picked by an interpreter or automatically picked using computer software as is well known in the art.

Referring now to FIG. 2, which illustrates the major processing step of this invention, a first step 30 is selecting a seismic trace volume having an interpreted horizon. Several types of trace volumes that may include an interpreted horizon are well known in the art. Trace volumes may differ in some acquisition feature, for examples volumes may be gathered as common midpoint, common offset or common reflection angle range. Trace volumes may also differ in some data processing feature, for example, AVO gradient or AVO intercept. Other features may distinguish volumes such as pressure wave or shear wave. According to this invention multiple volumes of seismic traces such as mentioned above are processed.

Figure 2A:
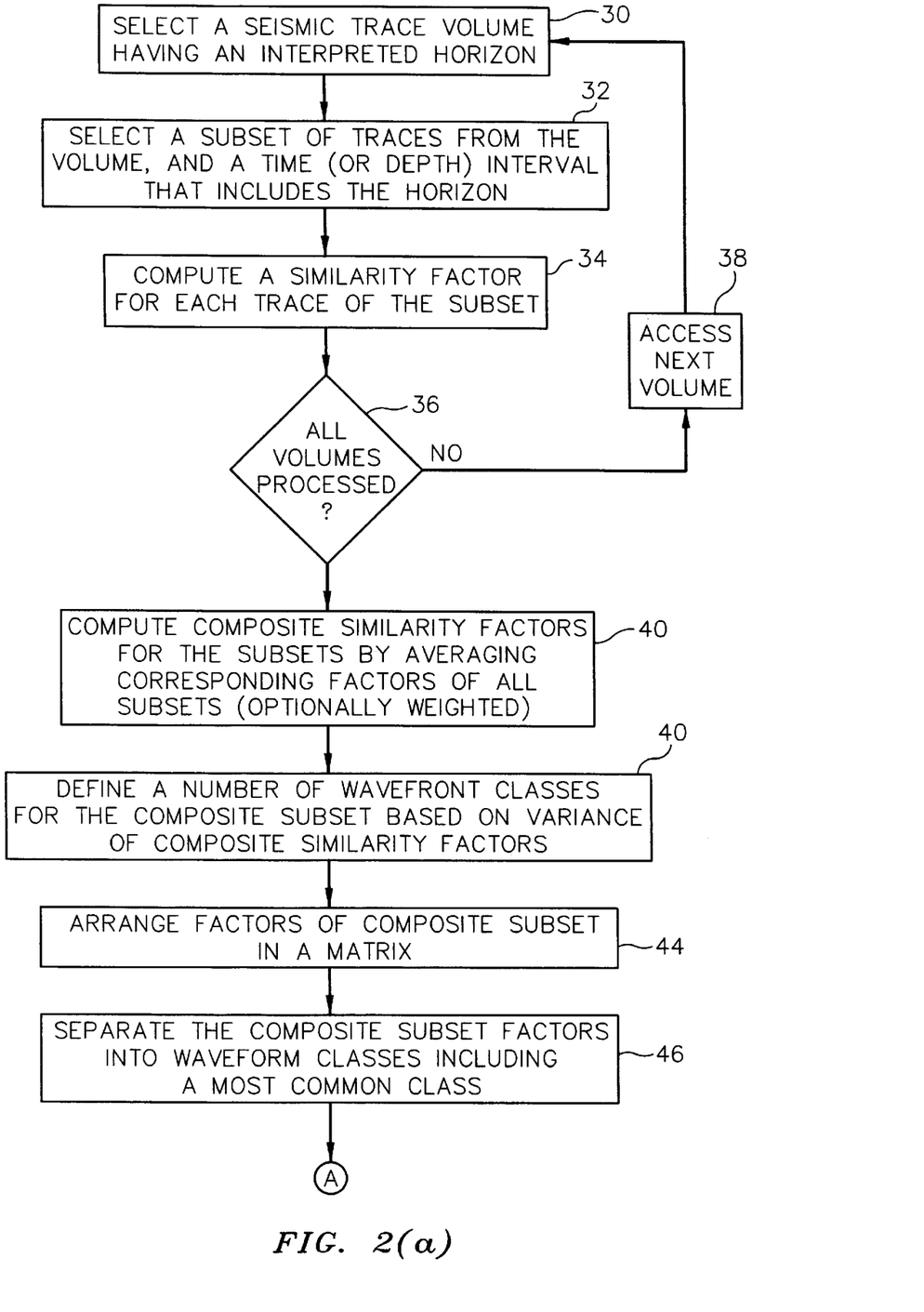
FIG. 2(a) –2(b) is a computer software flow diagram of the major data processing steps of this invention.
Figure 2B:
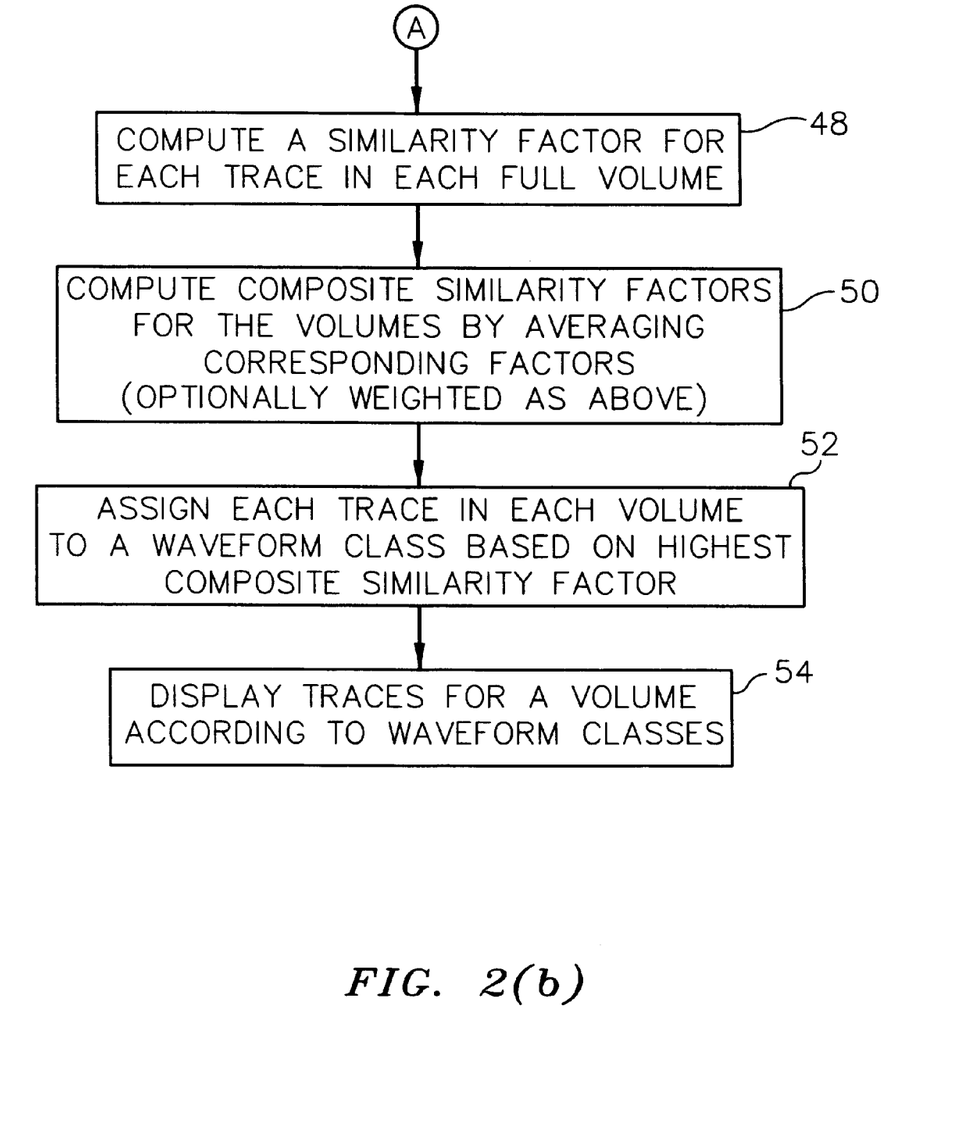

In step 32, a representative subset of spaced apart traces is selected that intersect the horizon 24. The subset might have 100 traces which include the extent of the horizon surface that is of interest. For example the subset might include a uniform spacing such as every fifth line and fifth trace of the grid array, which are selected from a trace volume having a thousand or more traces.

In step 34, the similarity factor for each trace of the subset with every other trace in the subset is determined. The most common measure of waveform similarity is the normalized correlation coefficient which is a measure of linear relationship between two waveforms. The major limitation of this measure is that it only considers the waveform shape and not absolute amplitude (i.e. two waveforms can have drastically different absolute amplitudes but have a high correlation coefficient). In cases where absolute amplitude should also be considered as an attribute in a similarity test, the normalized sample difference can be combined with the normalized correlation coefficient to form a new measure, referred to herein as the RB-factor.

The normalized correlation coefficient is a fairly well known measure. Given two time series ($A_i$ and $B_i$) of length N, the normalized correlation coefficient ($X_{(a,b)}$) is calculated as:

$$X_{(a,b)} = \frac{\sum_{i=1}^{N} a_i \cdot b_i}{\sqrt{\sum_{i=1}^{N} a_i^2} \cdot \sqrt{\sum_{i=1}^{N} b_i^2}}$$

where the length N is a comparison window corresponding to the selected time, or depth interval that includes the horizon 24. The normalized sample difference ($D_{(a,b)}$) is defined as follows:

$$D_{(a,b)} = \frac{\sum_{i=1}^{N} (|a_i| + |b_i|) - \sum_{i=1}^{N} |a_i - b_i|}{\sum_{i=1}^{N} (|a_i| + |b_i|)}$$

This yields a difference coefficient that is a similar form to the correlation coefficient in that two identical waveforms will yield a coefficient of 1.0.

The RB-factor is then defined as the weighted average of the two measures as follows:
$RB(a,b) = WX_{(a,b)} + (1-w) D_{(a,b)}$
where w is a weighting factor between 0 and 1 (commonly w is set to 0.5 for equal weighting).

Accordingly, an RB-factor is calculated for each trace of each subset based on comparisons with every other trace in the subset.

The programmed method questions at step 36 as to whether all of the trace volumes have been processed. When the result is "no" indicating that more trace volumes are available, step 30 is repeated via block 38, which accesses the next volume, and a corresponding subset is formed in step 32. When the result is "yes", indicating that all available volumes have been processed, composite RB-factors are computed in step 40 by averaging the RB-factor for corresponding traces in the subset of each trace volume that was processed. This is indicated in the step illustrated at reference numeral 40, where it is also noted that weighting of the factors may be applied, if desired. Next the program proceeds to step 42, which calls for defining a number of waveform classes for dividing the composite subset, and which will typically be decided by the interpreter based on the variance of the multiple composite RB-factors calculated in step 40.

In preparation for separating the composite RB-factors into waveform classes, the RB-factors are arranged in a square matrix as called for at step 44.

Figure 2C:
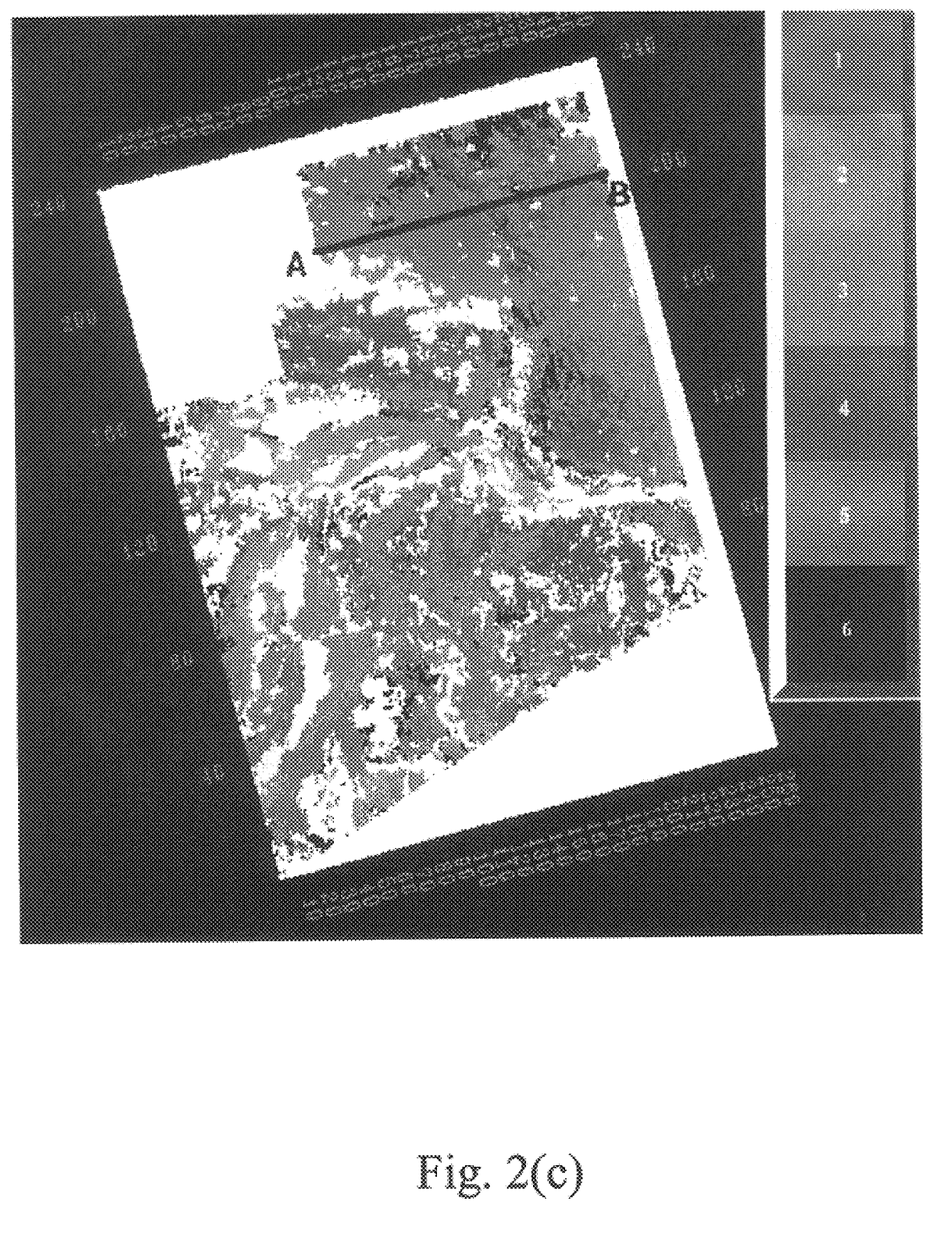
FIG. 2(c) –2(d) are color illustrations showing waveform classification trends in subterranean formations according to this invention.
Figure 2D:
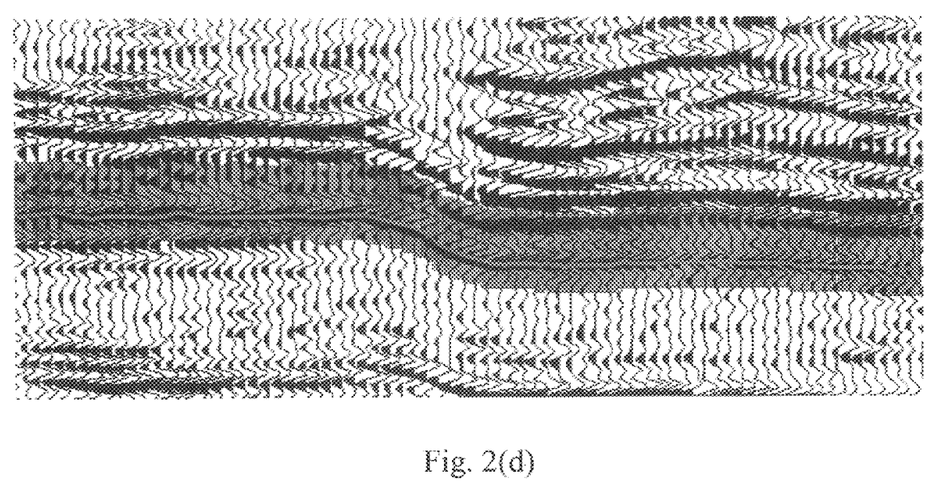

In step 46 the composite RB-factors of the composite subset are separated into a desired number of classes using an iterative procedure which is more fully explained with reference to FIG. 3. Next in step 48 an RB-factor (similarity) is computed for each trace in a full volume, and in step 50 corresponding individual factors from each volume are averaged (optionally, and with previously used weighting) to form the composite RB-factor for an individual trace. The trace is then compared to the respective diagnostic waveform shapes (previously determined in step 46) using its composite RB-factor. In step 52 the trace is assigned one of the previously determined waveform classes based on its highest composite RB-factor. If the highest composite RB-factor for the trace is below a user defined threshold (e.g. 0.75) the trace is assigned a null valve. Finally in step 54 a map or seismic cube overlay of the waveform classes is output for the full volume. FIG. 2(c) is a map view illustrating six waveform classes which are color coded according to color bar on the drawing. FIG. 2(d) is a sectional view corresponding to the line AB on FIG. 2(c) which shows the color code waveform classes along an interpreted horizon.

Figure 3:
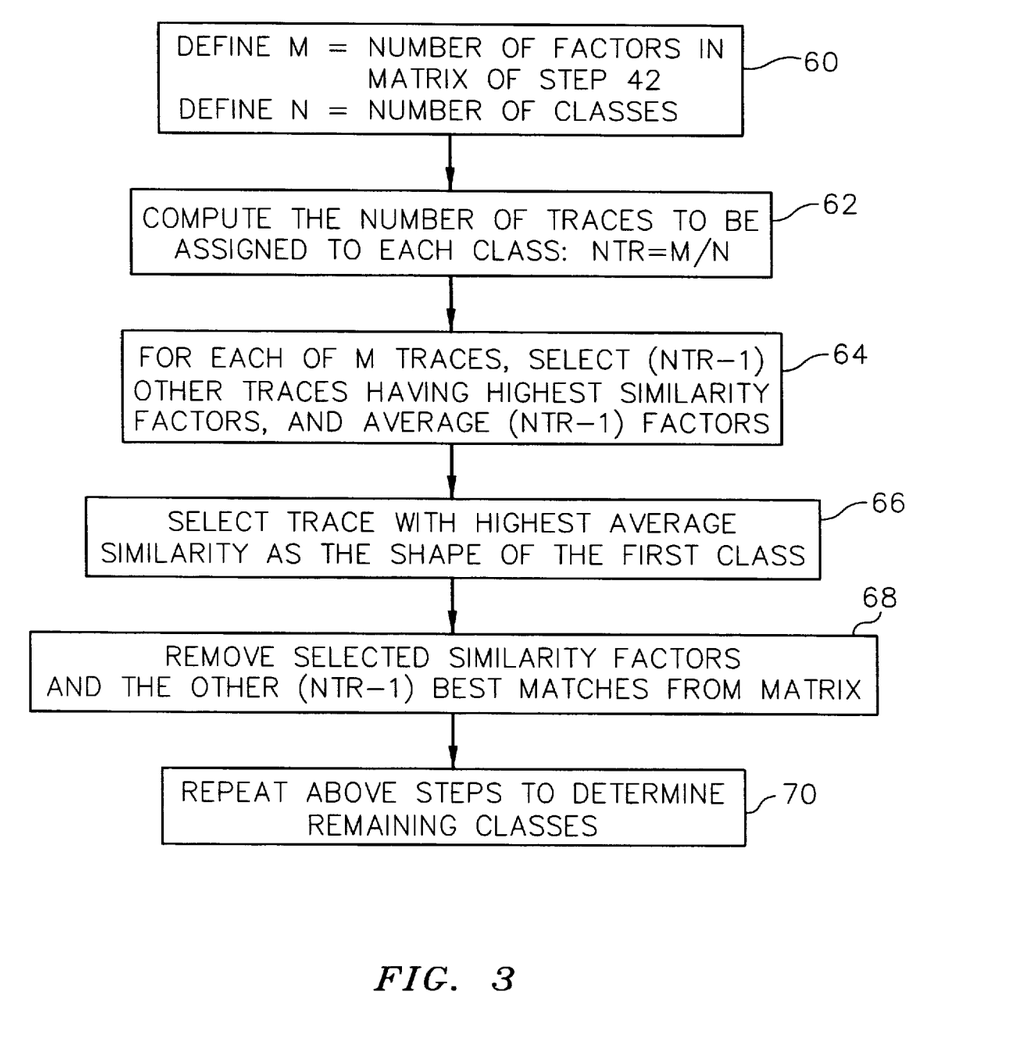
FIG. 3 is a flow diagram illustrating data processing steps for deciding waveform classification according to step 52 in FIG. 2.

Referring now to FIG. 3, there is illustrated the processing step for deciding waveform classification. In a first step 60, the numbers M an N are defined respectively as the number of RB-factors in the matrix and the number of waveform classes to be provided. Accordingly, M corresponds to the number of traces selected for the subset, and N as previously mentioned, is selected by the interpreter based on the range of variance in RB-factors of the subset. Next in step 62 the number of traces to be assigned to each class is calculated in NTR=M/N. For example if there are 100 traces in the subset and 10 classes are desired, then there will be 10 traces in each class.

The programmed method then proceeds to step 64, where for each of M traces in the subset, the (NTR-1) other traces having the highest RB-factor (i.e., best matches) to the trace being considered are selected, and averaged. Next, as called for in step 66, the trace with the highest average RB-factor computed in the previous step is selected as the shape for the first trace in the first class. The method then proceeds to step 68 for the step of removing from the matrix the RB-factors for the first trace selected in the previous step along with the (NTR-1) best matches. Then in step 70 the above steps 64–68 are repeated to decide the remaining classes.

SHAPE CLASSIFICATION EXAMPLE

This example numerically illustrates the present method for classifying waveforms such that trends of multiple attributes can be better displayed. Given that the composite similarly matrix RB $(_{i,j})$ developed in step 40 of FIG. 2, is the similary of trace i to trace j, and where i and j range from 1 to M, the procedure for finding the most common waveform shapes is as follows: For this example assume: M=10 traces, and N=2 classes. First compute the number of traces (NTR) in each class as: 10/2 equal to 5 traces in each class:

Referring now to Table I, which numerically illustrates the composite RB-factors for the 10 traces compared to each other, and displayed in a matrix format, we wish to separate the ten traces into two classes.

TABLE I

Shape Classification Matrix for First Class

| Trc# | 1 | 2 | 3 | 4 | 5 | 6 | 7 | 8 | 9 | 10 |
|---|---|---|---|---|---|---|---|---|---|---|
| 1 | 1 | 0.86 | 0.91 | 0.86 | 0.77 | 0.58 | 0.63 | 0.47 | 0.59 | 0.59 |
| 2 | 0.86 | 1 | 0.86 | 0.9 | 0.75 | 0.56 | 0.27 | 0.45 | 0.56 | 0.55 |
| 3 | 0.91 | 0.86 | 1 | 0.87 | 0.83 | 0.59 | 0.63 | 0.35 | 0.49 | 0.47 |
| 4 | 0.86 | 0.9 | 0.87 | 1 | 0.79 | 0.63 | 0.26 | 0.34 | 0.43 | 0.41 |
| 5 | 0.77 | 0.75 | 0.83 | 0.79 | 1 | 0.77 | 0.64 | 0.56 | 0.61 | 0.66 |
| 6 | 0.58 | 0.56 | 0.59 | 0.63 | 0.77 | 1 | 0.78 | 0.63 | 0.48 | 0.46 |
| 7 | 0.63 | 0.27 | 0.63 | 0.26 | 0.64 | 0.78 | 1 | 0.83 | 0.67 | 0.65 |
| 8 | 0.47 | 0.45 | 0.35 | 0.34 | 0.56 | 0.63 | 0.83 | 1 | 0.86 | 0.8 |
| 9 | 0.59 | 0.56 | 0.49 | 0.43 | 0.61 | 0.48 | 0.67 | 0.86 | 1 | 0.91 |
| 10 | 0.59 | 0.55 | 0.47 | 0.41 | 0.66 | 0.46 | 0.65 | 0.8 | 0.91 | 1 |

Next, compute the average of the largest (NTR-1) (i.e., 4) RB-factor for each trace as follows:

a. Average Similarity of trace 1=(0.91+0.86+0.86+0.77)/4= 0.85
b. Average Similarity of trace 2=(0.90+0.86+0.86+0.75)/4= 0.8425
c. Average Similarity of trace 3=(0.91+0.87+0.86+0.83)/4= 0.8675
d. Average Similarity of trace 4=(0.90+0.87+0.86+0.79)/4= 0.855
e. Average Similarity of trace 5=(0.83+0.79+0.77+0.77)/4= 0.79
f. Average Similarity of trace 6=(0.78+0.77+0.63+0.63)/4= 0.7025
g. Average Similarity of trace 7=(0.83+0.78+0.67+0.65)/4= 0.7325
h. Average Similarity of trace 8=(0.86+0.83+0.80+0.63)/4= 0.78
i. Average Similarity of trace 9=(0.91+0.86+0.67+0.61)/4= 0.7625
j. Average Similarity of trace 10=(0.91+0.80+0.66+0.65)/4= 0.755

Select the trace with the highest average RB-factor which in this example is trace #3 and the other (NTR-1) traces in this class are 1, 2, 4, and 5. Removing these traces from the similarity matric we have the following Table II.

c. Average Similarity of trace 8=(0.86+0.83+0.80+0.63)/4= 0.78
d. Average Similarity of trace 9=(0.91+0.86+0.67+0.48)/4= 0.73
e. Average Similarity of trace 10=(0.91+0.80+0.65+0.46)/4=0.705 Selecting trace 8 as the trace with the highest RB-factor, the other (NTR-1) traces are 6, 7, 9 and 10.

Figure 4:
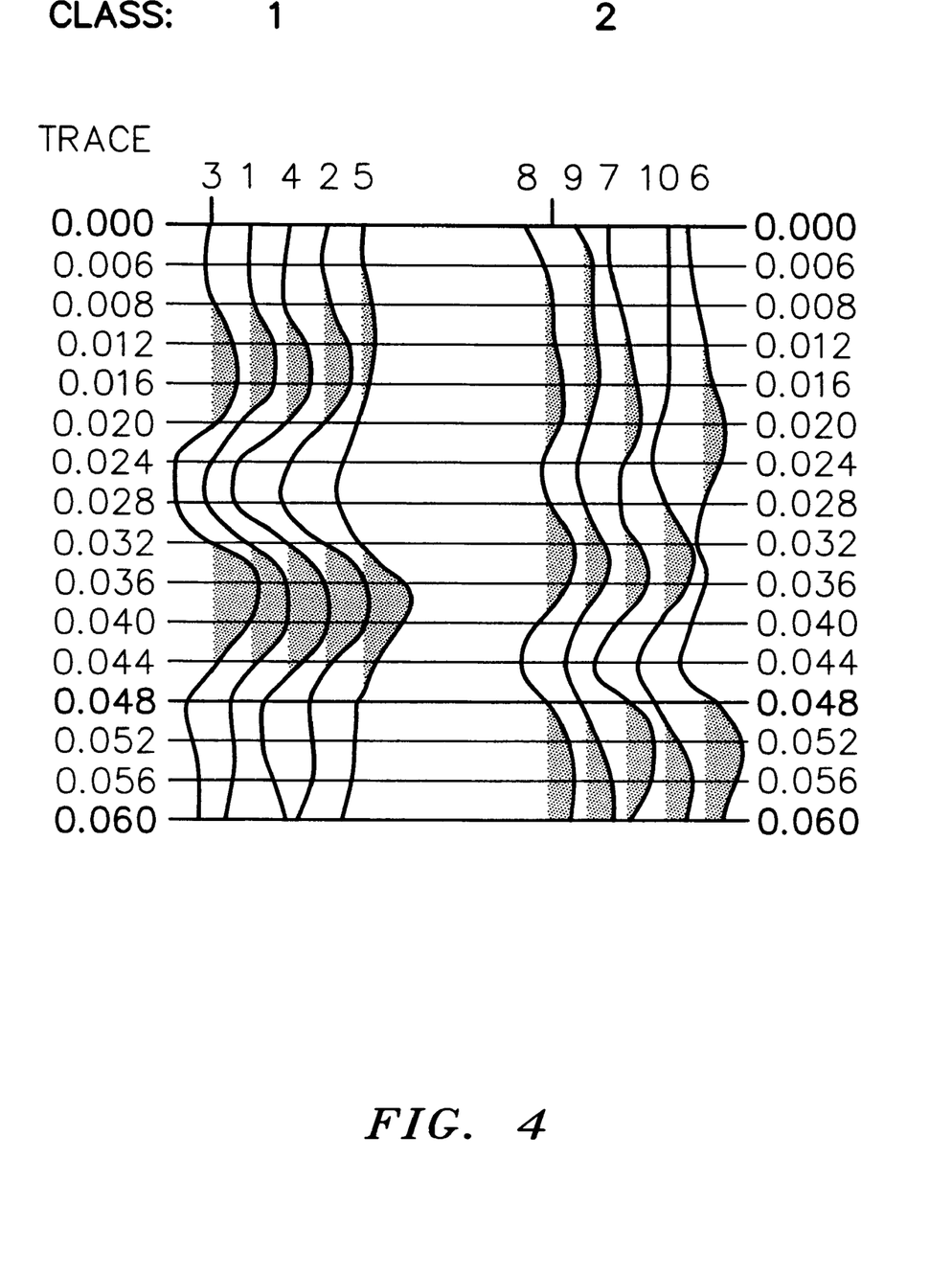
FIG. 4 illustrates a subset of ten seismic traces grouped into two classes and displayed in the order of quality of match to the first trace in the class.

FIG. 4 shows a display of the ten example traces with a time axis in seconds. The traces are displayed according to the respective classes, and where the traces are grouped in their respective classes in the order of the quality of match to the first trace in the class, i.e. the order for the first class is 3, 1, 4, 2, 5 and for the second class the order is 8, 9, 7, 10, 6. A map or seismic cube overlay of the waveform classes can be output for the full volume to help identify the trend of reservoir conditions as they extend away from the wellbore.

In this disclosure, there is shown and described only the preferred embodiments of this invention. It is contemplated that modifications of, and alternatives to, these embodiments, where such modifications and alternatives obtain the advantages and benefits of this invention, will be apparent to those of ordinary skill in the art having reference to this specification and its drawings. It is to be understood that such modifications and alternatives are within the scope of this invention as subsequently claimed herein.

TABLE II

Shape Classification Matrix for Second Class

| Trc# | 1 | 2 | 3 | 4 | 5 | 6 | 7 | 8 | 9 | 10 |
|---|---|---|---|---|---|---|---|---|---|---|
| 1 | -1 | -1 | -1 | -1 | -1 | -1 | -1 | -1 | -1 | -1 |
| 2 | -1 | -1 | -1 | -1 | -1 | -1 | -1 | -1 | -1 | -1 |
| 3 | -1 | -1 | -1 | -1 | -1 | -1 | -1 | -1 | -1 | -1 |
| 4 | -1 | -1 | -1 | -1 | -1 | -1 | -1 | -1 | -1 | -1 |
| 5 | -1 | -1 | -1 | -1 | -1 | -1 | -1 | -1 | -1 | -1 |
| 6 | -1 | -1 | -1 | -1 | -1 | 1 | 0.78 | 0.63 | 0.48 | 0.46 |
| 7 | -1 | -1 | -1 | -1 | -1 | 0.78 | 1 | 0.83 | 0.67 | 0.65 |
| 8 | -1 | -1 | -1 | -1 | -1 | 0.63 | 0.83 | 1 | 0.86 | 0.8 |
| 9 | -1 | -1 | -1 | -1 | -1 | 0.48 | 0.67 | 0.86 | 1 | 0.91 |
| 10 | -1 | -1 | -1 | -1 | -1 | 0.46 | 0.65 | 0.8 | 0.91 | 1 |

Now for the second class, we again compute the average of the largest four RB-factor for each remaining trace as follows:

a. Average Similarity of trace 6=(0.78+0.63+0.48+0.46)/4= 0.5875
b. Average Similarity of trace 7=(0.83+0.78+0.67+0.65)/4= 0.7325

That which is claimed:

1. A method for using one or more seismic trace volumes to identify a real trends of multiple seismic attributes along a subsurface horizon, said method comprising:

a) selecting a representative subset of traces from said seismic trace volume, wherein said subset of traces intersects said horizon;

b) comparing the full waveform of each trace in each said subset of each trace volume to every other trace in said subset over predefined zones above and below said subsurface horizon to determine a similarity factor for each trace with every other trace in said subset of traces, c) separating traces in said subset into a number of waveform classes based on variance of said similarity factor for traces in said subset; and d) grouping traces in said subset according to said waveform classes, wherein display of traces according to said waveform classes reveals a real trends of multiple seismic attributes.

2. A method in accordance with claim 1, wherein said one or more seismic trace volumes are selected from the group of seismic trace volumes that differ in an acquisition feature, said group consisting of:

a common midpoint volume;

a common offset volume;

a common reflection angle volume;

a near stack volume; and a far stack volume.

3. A method in accordance with claim 1, wherein said one or more seismic trace volumes are selected from the group of volumes that differ in some data processing features, said group of volumes consisting of:

an amplitude vs. offset (AVO) gradient volume; and;

an AVO intercept volume.

4. A method in accordance with claim 1, wherein said one or more seismic trace volumes are selected from the group of volumes that differ in the type of seismic wave propagated, said group of volumes consisting of:

a pressure wave generated volume; and a shear wave generated volume.

5. A method in accordance with claim 1, wherein said representative subsets of traces comprise a group of uniformly spaced traces in a grid array.

6. A method in accordance with claim 1, wherein said similarity factors are determined using an algorithm which considers both shape and absolute amplitude difference of the waveform segments being compared.

7. A method in accordance with claim 6, wherein said algorithm uses the following expression for determining the normalized absolute amplitude difference:

$$D_{(a,b)} = \frac{\sum_{i=1}^{N}(|a_i|+|b_i|) - \sum_{i=1}^{N}|a_i - b_i|}{\sum_{i=1}^{N}(|a_i|+|b_i|)}.$$

and wherein composite similarity factors for said subset are obtained by averaging corresponding factors in subsets of all volumes processed.

8. A method in accordance with claim 1, wherein said step of grouping traces in said subset according to waveform classes comprises:

(a) arranging said similarity factors of said subset in a square matrix;

(b) defining a number designated M, which is equal to the number of said similarity factors in said matrix;

(c) defining a number designated N, which is equal to the desired number of classes;

(d) computing the number M/N designated NTR which is equal to the number of traces to be assigned to each class;

(e) for each of M traces, selecting (NTR-1) other traces having the highest the highest similarity factors and averaging the (NTR-1) similarity factors;

(f) selecting the trace having the highest average similarity factor as the shape of the first class;

(g) removing the trace having he highest similarity factor and the other (NTR-1) traces from said matrix; and (h) repeating steps (e), (f), and (g) to determine traces in the remaining classes.

9. Apparatus for using one or more seismic trace volumes to identify a real trends of multiple seismic attributes along a subsurface horizon, said apparatus comprising:

a computer programmed to perform the following method steps:

(a) selecting a representative subset of traces from said seismic trace volumes, wherein said subset of traces intersects said horizon.

(b) comparing the full waveform of each trace in each said subset of each trace volumes to every other trace in said subset over predefined zones above and below said subsurface horizon to determine a similarity factor for each trace with every other trace in said subset of traces;

(c) separating traces in said subset into a number of waveform classes based on the variance of said similarity factor for traces in said subset; and (d) grouping traces in said subset according to said waveform classes, wherein display of traces according to said waveform classes reveals a real trends of multiple seismic attributes.

10. Apparatus in accordance with claim 9, wherein said one or more seismic trace volumes are selected from the group of seismic trace volumes that differ in an acquisition feature, said group consisting of:

a common midpoint volume;

a common offset volume;

a common reflection angle volume;

a near stack volume; and a far stack volume.

11. Apparatus in accordance with claim 9, wherein said one or more seismic trace volumes are selected from the group of volumes that differ in some data processing feature, said group of volumes consisting of:

an amplitude vs. offset (AVO) gradient volume; and an AVO intercept volume.

12. Apparatus in accordance with claim 9, wherein said one or more seismic trace volumes are selected from the group of volumes that differ in the type of seismic wave propagated, said group of volumes consisting of:

a pressure wave generated volume; and a shear wave generated volume.

13. Apparatus in accordance with claim 9, wherein said representative subset of traces comprises a group of uniformly spaced traces in a grid array.

14. Apparatus in accordance with claim 9, wherein said step of grouping traces in said subset according to waveform classes comprises:

(a) arranging said similarity factors of said subset in a square matrix (b) defining a number designated M, which is equal to the number of said similarity factors in said matrix;

(c) defining a number designated N, which is equal to the desired number of classes;

(d) computing the number M/N designated NTR which is equal to the number of traces to be assigned to each class;

(e) for each of M traces, selecting (NTR-1) other traces having the highest the highest similarity factors and averaging the (NTR-1) similarity factors;

(f) selecting the trace having the highest average similarity factor as the shape of the first class;

(g) removing the trace having he highest similarity factor and the other (NTR-1) traces from said matrix; and (h) repeating steps (e), (f), and (g) to determine traces in the remaining classes.

* * * * *

UNITED STATES PATENT AND TRADEMARK OFFICE
CERTIFICATE OF CORRECTION

PATENT NO.    : 6,223,126 B1
DATED         : April 24, 2001
INVENTOR(S)   : Dennis B. Neff, Scott A. Runnestrand, and Edgar L. Butler It is certified that error appears in the above-identified patent and that said Letters Patent is hereby corrected as shown below:

Title page:
Item [57], line 2, please delete "a real" and insert -- areal -- therefor.

Column 1,
Line 8, please delete "a real" and insert -- areal -- therefor.

Column 2,
Line 32, please delete "a real" and insert -- areal -- therefor.
Line 35, please delete "a real" and insert -- areal -- therefor.

Column 3,
Line 9, please delete "a real" and insert -- areal -- therefor.

Claims,

Column 8, claim 1,
Line 62, please delete "a real" and insert -- areal -- therefor.

Column 9, claim 1,
Line 13, please delete "a real" and insert -- areal -- therefor.

Column 10, claim 9,
Line 15, please delete "a real" and insert -- areal -- therefor.
Line 33, please delete "a real" and insert -- areal -- therefor.

Signed and Sealed this

Eleventh Day of September, 2001

Attest:

*Nicholas P. Godici*

NICHOLAS P. GODICI
*Attesting Officer*    *Acting Director of the United States Patent and Trademark Office*